United States Patent
Mestha et al.

(10) Patent No.: US 7,283,240 B2
(45) Date of Patent: Oct. 16, 2007

(54) SPECTROPHOTOMETER TARGET DISTANCE VARIATION COMPENSATION

(75) Inventors: Lalit K. Mestha, Fairport, NY (US); Tonya L. Love, Rochester, NY (US); Peter Paul, Webster, NY (US); Claude S. Fillion, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 304 days.

(21) Appl. No.: 11/210,957

(22) Filed: Aug. 24, 2005

(65) Prior Publication Data

US 2007/0046941 A1    Mar. 1, 2007

(51) Int. Cl.
*G01J 3/46*   (2006.01)

(52) U.S. Cl. ............ 356/402; 356/425; 356/445; 356/620; 356/71

(58) Field of Classification Search ........... 356/402, 356/425, 444, 445, 448, 237.1, 71, 603, 607, 356/614, 620; 358/504
See application file for complete search history.

(56) References Cited

U.S. PATENT DOCUMENTS

| | | | |
|---|---|---|---|
| 6,351,308 | B1 | 2/2002 | Mestha |
| 6,384,918 | B1 | 5/2002 | Hubble, III et al. |
| 6,449,045 | B1 | 9/2002 | Mestha |
| 6,538,770 | B1 | 3/2003 | Mestha |
| 6,556,300 | B2 | 4/2003 | Tandon et al. |
| 6,556,932 | B1 | 4/2003 | Mestha et al. |
| 6,567,170 | B2 | 5/2003 | Tandon et al. |
| 6,584,435 | B2 | 6/2003 | Mestha et al. |
| 6,587,793 | B2 | 7/2003 | Viassolo et al. |
| 6,603,551 | B2 | 8/2003 | Mestha et al. |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,650,416 | B2 | 11/2003 | Tandon et al. |
| 6,690,471 | B2 | 2/2004 | Tandon et al. |
| 6,721,692 | B2 | 4/2004 | Mestha et al. |
| 6,809,855 | B2 | 10/2004 | Hubble, III et al. |
| 2005/0160092 | A1 | 7/2005 | Mestha et al. |

OTHER PUBLICATIONS

U.S. Appl. No. 11/092,674, filed Mar. 30, 2005, by Peter Paul, et al, entitled "Systems and Methods for Compensating for Temperature Induced Spectral Emission Variations in LED Based Color Parameter Measuring Devices".
U.S. Appl. No. 10/833,231, filed Apr. 27, 2004 by Lalit K. Mestha et al, entitled "Full Width Array Scanning Spectrophotometer".
U.S. Appl. No. 11/086,087, filed Mar. 22, 2005 by Lalit K. Mestha, entitled "Method and System to Personalize Sensor Characterizing Reference Database in Multiple LED Spectrophotometers".
U.S. Appl. No. 09/710,106, filed Nov. 10, 2000 by Dennis L. Venable and Raja Balasubramanian entitled "Patch Codes for Color Calibration Job Identification Encoding".

*Primary Examiner*—Gregory J. Toatley, Jr.
*Assistant Examiner*—Abdullahi Nur
(74) *Attorney, Agent, or Firm*—James J. Ralabate (57) ABSTRACT

Spectrophotometer color measurement with a target illumination system and a reflected illumination sensing system where the target surface is variably spaced from said spectrophotometer. Color correction calibration information corresponding to color measurements for known different spacings of a test target surface from the spectrophotometer are obtained and stored. In use, the spacing of the actual target surface from the spectrophotometer is measured to provide a target spacing information signal. That signal is automatically combined with the stored color correction calibration information for the corresponding distances to provide at least partial correction of color measurement errors of the spectrophotometer for variable spacing of the target surface relative to the spectrophotometer even with low cost fixed focus optics. The spectrophotometer output can be so corrected by changing the target illumination, such as by LED pulse width changes, and/or by corrective adjustment of the measured reflectances.

23 Claims, 7 Drawing Sheets

SPECTROPHOTOMETER TARGET DISTANCE VARIATION COMPENSATION

Cross-reference is made to co-pending and commonly assigned U.S. application Ser. No. 11/092,674, filed Mar. 30, 2005, by Peter Paul, et al, entitled "Systems and Methods for Compensating for Temperature Induced Spectral Emission Variations in LED Based Color Parameter Measuring Devices".

Disclosed in the embodiment herein is an improved spectrophotometer system for more accurately measuring target areas which may vary in their distance from a spectrophotometer, such as, but not limited to, on-line measuring of the colors of color test areas on printed test sheets or regular prints while the sheets are moving in a paper path of a color printer at a variable distance from a spectrophotometer on one side of that paper path. Other such on-line non-contact color inspection or control applications for various articles, objects or products moving relative to a spectrophotometer or vice versa could include inspecting the color of cloth or paper webs as they are being printed or wound, foodstuffs, recycling streams, etc.

By way of background, prior inventions by inventors for the same assignee, Xerox Corporation, have already provided significant improvements in such spectrophotometers, including reducing the sensitivity to, or improving the accuracy for, variations in the angular orientation or a test target with a spectrophotometer and the spacing (Z axis) relationship of a color test target with a spectrophotometer, making it more suitable for the above and other commercial or industrial utilities. E.g., U.S. Pat. No. 6,384,918 B1 issued May 7, 2002 to Fred F. Hubble et al, entitled "Spectrophotometer for Color Printer Control With Displacement Insensitive Optics"; U.S. Pat. No. 6,639,669 B2 issued Oct. 28, 2003 to Fred F. Hubble et al, entitled "Diagnostics for Color Printer On-Line Spectrophotometer Control System"; U.S. Pat. No. 6,721,692 issued Apr. 13, 2004 to Lalit K. Mestha et al, entitled "Systems and Methods for Determining Spectra Using Dynamic Least Squares Algorithms With Measurements From LED Color Sensor"; U.S. Pat. No. 6,633,382 issued Oct. 14, 2003 to Fred Hubble III et al, entitled "Angular, Azimuthal and Displacement Insensitive Spectrophotometer for Color Printer Color Control Systems"; U.S. Pat. No. 6,809,855 issued Oct. 26, 2004 to Fred Hubble III et al, entitled "Angular, Azimuthal and Displacement Insensitive Spectrophotometer for Color Printer Color Control Systems"; U.S. Pat. No. 6,603,551 issued Aug. 5, 2003 to Lalit K. Mestha et al, entitled "Angular, Azimuthal and Displacement Insensitive Spectrophotometer for Color Printer Color Control Systems"; U.S. Pat. No. 6,351,308 issued Feb. 26, 2002 to Lalit K. Mestha, entitled "Color Printer Color Control System with Automatic Spectrophotometer Calibration System" U.S. Pat. No. 6,538,770 issued Mar. 25, 2003 to Lalit K. Mestha, entitled "Color Printer Color Control System Using Dual Mode Banner Color Test Sheets"; U.S. Pat. No. 6,621,576 issued Sep. 16, 2003 to Jagdish C. Tandon et al, entitled "Color Imager Bar Based Spectrophotometer for Color Printer Color Control System"; U.S. Pat. No. 6,690,471 issued Feb. 10, 2004 to Jagdish C. Tandon et al, entitled "Color Imager Bar Based Spectrophotometer for Color Printer Color Control System"; U.S. Pat. No. 6,556,300 issued Apr. 29, 2003 to Jagdish C. Tandon et al, entitled "Color Imager Bar Based Spectrophotometer Photodetector Optical Orientation"; U.S. Pat. No. 6,567,170 issued May 20, 2003 to Jagdish C. Tandon et al, entitled "Simultaneous Plural Colors Analysis Spectrophotometer"; U.S. Pat. No. 6,650,416 issued Nov. 18, 2003 to Jagdish C. Tandon et al, entitled "Color Imager Bar Based Spectrophotometer Photodetector Optical Orientation"; U.S. application Ser. No. 10/833,231 filed Apr. 27, 2004 by Lalit K. Mestha et al, entitled "Full Width Array Scanning Spectrophotometer"; U.S. Pat. No. 6,584,435 issued Jun. 24, 2003 to Lalit K. Mestha et al, entitled "Systems and Methods for Determining Spectra Using Dynamic Karhunen-Loeve Algorithms with Measurements From LED Color Sensor"; U.S. Pat. No. 6,587,793 issued Jul. 1, 2003 to Daniel E. Viassolo et al, entitled "Systems And Methods For Determining Spectra Using Fuzzy Inference Algorithms With Measurements From Led Color Sensor"; U.S. Pat. No. 6,449,045 issued Sep. 10, 2002 to Lalit K. Mestha, entitled "System and Method for Reconstruction of Spectral Curves, Using Measurements From a Color Sensor and Statistical Techniques"; U.S. Pat. No. 6,556,932 issued Apr. 29, 2003 to Lalit K. Mestha et al, entitled "System and Method for Reconstruction of Spectral Curves Using Measurements from a Color Sensor and Aspectral Measurement System Model"; U.S. application Ser. No. 10/758,096 filed Jan. 16, 2004 to Lalit K. Mestha et al, Publication No. 20050160092 published Jul. 21, 2005, entitled "Reference Database and Method for Determining Spectra Using Measurements from an Led Color Sensor, and Method of Partitioning a Reference Database"; U.S. application Ser. No. 11/086,087 filed Mar. 22, 2005 by Lalit K. Mestha, entitled "Method and System to Personalize Sensor Characterizing Reference Database in Multiple LED Spectrophotometers"; and allowed U.S. application Ser. No. 09/710,106 filed Nov. 10, 2000 by Dennis L. Venable and Raja Balasubramanian entitled "Patch Codes for Color Calibration Job Identification Encoding". To the extent these prior patents may be useful for these present descriptions they are incorporated by reference herein.

As taught in these references, relatively low cost spectrophotometers using a multiple but relatively limited number of LED solid-state illumination sources of different peak wavelengths can determine color target spectral reflectivity to desirably provide stable and accurate color target measurements under nominal target operating distance conditions. However, as noted therein, there are practical design constraints in commercial on-line usage of spectrophotometers. For example, the fairly extensive paper path baffle spacing normally defining the opposing sides of the paper path of a xerographic or other printer in various different paper path locations where a spectrophotometer might be desirably positioned. The moving color targets on the surfaces of the printed sheets moving in such a fairly wide paper path may thus in some cases be displaced in the Z-direction (normal to the direction of paper travel) by more than, for example, plus or minus 3 mm from a nominal (desired or fixed optics focal lengths designed) target sensing position from the spectrophotometer.

LED spectrophotometers may be desirably designed with significantly displacement insensitive optics, as in the above-cited U.S. Pat. No. 6,384,918 and others. That is, they may already have specifically designed illuminator and sensor optics and orientations to improve color measurement accuracy for tilted or partially displaced targets. However, it has been found that greater target distance variations, of greater than, for example, plus or minus 3 mm from the nominal sensing position, may make compensation solely by such illuminator and sensor optics and their orientations insufficiently accurate for various applications.

Spectrophotometer cost can be a significant deterrent to their commercial usage. For example, where it is desired to permanently install spectrophotometers in numerous printers or other commercial products, not just using them as mere laboratory testing devices. Practical commercial considerations in this respect include the fact that specially designed lenses are generally more expensive, and glass lenses are generally more expensive than simple plastic lenses. This constrains providing a spectrophotometer with greater depth of focus or variable focal length spectrophotometer optics, or a spectrophotometer with an auto-focus system of automatic re-focusing.

The optics of such a reasonable or lower cost spectrophotometer may thus have a practical accuracy target range limitation of approximately plus or minus 3 mm or less from a preset nominal target spacing. Yet, as noted, when mounted in or to a marking engine or its output path for feedback control of output color prints, the spectrophotometer may be subject to wider range of target displacement variation (greater than ±3 mm), depending on its placement position in the system, and thus should desirably accurately and stably measure target spectral reflectivity under varying target displacement conditions both within and beyond such a nominal ±3 mm target spacing variation range.

The embodiment disclosed herein is intended to provide an inexpensive way to improve such target displacement latitude for a spectrophotometer in these and other desirable practical commercial applications. This is desirably without degrading the spectrophotometer measurement accuracy, speed, or other advantages, to the extent possible.

A specific feature of the specific embodiments disclosed herein is to provide a color spectrophotometer system with an illumination system and a reflected illumination sensing system for providing an output of electronic color measurement information from the colors of color target areas on a target surface illuminated by said illumination system, where said target surface may be variably spaced from said color spectrophotometer system, further including at least one color correction calibration system providing color correction calibration information corresponding to color measurement errors of said color spectrophotometer for known said variable spacings of said target surface from said color spectrophotometer, a target distance measurement system for measuring said variable spacing of said target surface from said color spectrophotometer to provide a target area spacing information signal, said target area spacing information signal being automatically combined with said color correction calibration information from said color correction calibration system for at least partial correction of said color measurement errors of said color spectrophotometer for said variable spacing of said target surface from said color spectrophotometer.

Further specific features disclosed in the embodiments herein, individually or in combination, include those wherein said color spectrophotometer system illumination system comprises multiple different peak spectra sequentially illuminated LED's and said at least partial correction of said color measurement errors of said color spectrophotometer with said variable spacing of said target surface from said color spectrophotometer comprises varying the total illumination of said sequentially illuminated LED's with said variable spacing of said target surface from said color spectrophotometer under the control of said color correction calibration information from said color correction calibration system; and/or in which said color spectrophotometer system illumination system comprises plural different peak spectra sequentially illuminated LED's and said at least partial correction of said color measurement errors of said color spectrophotometer with said variable spacing of said target surface from said color spectrophotometer comprises varying the illumination time periods of said sequentially illuminated LED's with said variable spacing of said target surface from said color spectrophotometer with said distance measurement system target area spacing information signal and said color correction calibration information from said color correction calibration system; and/or including a controller for adjusting said output of electronic color measurement information of said color spectrophotometer system in proportion to said target area spacing information signal from said target distance measurement system; and/or including a controller for warping said output of electronic color measurement information of said color spectrophotometer system in proportion to said target area spacing information signal from said target distance measurement system, wherein said controller comprises a predetermined plural set of said output of electronic color measurement information of said color spectrophotometer system respectively associated with corresponding discrete pre-measured target area spacings; and/or further including an interpolator for interpolation between adjacent said outputs of electronic color measurement information of said color spectrophotometer system respectively associated with adjacent said corresponding discrete pre-measured target area spacings; and/or wherein said target area spacing information signal is automatically combined with said color correction calibration information from said color correction calibration system for at least partial correction of said color measurement errors of said color spectrophotometer for said variable spacing of said target surface from said color spectrophotometer by warping said color output of electronic color measurement information in proportion to a set of predetermined color measurements of said color spectrophotometer for respective plural known spacings of said spectrophotometer from a test target surface; and/or wherein said target area spacing information signal from said target distance measurement system is compared to interpolated data from a set of predetermined color measurements of said color spectrophotometer for respective plural known spacings of said spectrophotometer from a test target surface; and/or wherein said color correction calibration system comprises an electronically stored table; and/or wherein said target surface variably spaced from said color spectrophotometer is the surface of print media in a printer moving past said color spectrophotometer; and/or wherein said reflected illumination sensing system has an output operatively connected to a signal amplifier with an adjustable gain, wherein said at least partial correction of said color measurement errors of said color spectrophotometer with said variable spacing of said target surface from said color spectrophotometer comprises varying the adjustable gain of said signal amplifier with said variable spacing of said target surface from said color spectrophotometer under the control of said color correction calibration information from said color correction calibration system; and/or a color measurement method using a spectrophotometer system with an illumination system and a reflected illumination sensing system providing an output of electronic color measurement information from the colors of color target areas on a target surface illuminated by said illumination system, where said target surface is variably spaced from said color spectrophotometer system, further including providing color correction calibration information corresponding to color measurement errors of said color spectrophotometer for known different spacings of said target surface from said color spectrophotometer, measuring said variable spacing of said target surface from said color spectrophotometer to provide a target area spacing information signal, automatically combining said target area spacing information signal with said color correction calibration information to provide at least partial correction of said color measurement errors of said color spectrophotometer for said variable spacing of said target surface from said color spectrophotometer; and/or in which said illumination system comprises sequentially illuminated plural different peak spectra LED's and said at least partial correction of said color measurement errors of said color spectrophotometer with said variable spacing of said target surface from said color spectrophotometer comprises varying the total illumination of said sequentially illuminated LED's with said variable spacing of said target surface from said color spectrophotometer and said color correction calibration information; and/or in which said color spectrophotometer system illumination system comprises multiple different peak spectra sequentially illuminated LED's and said at least partial correction of said color measurement errors of said color spectrophotometer with said variable spacing of said target surface from said color spectrophotometer comprises varying the illumination time periods of said sequentially illuminated LED's with said target area spacing information signal and said color correction calibration information; and/or including adjusting said output of electronic color measurement information of said color spectrophotometer system in proportion to said target area spacing information signal; and/or including adjusting said output of electronic color measurement information of said color spectrophotometer system in proportion to said target area spacing information signal from said target distance measurement with a controller comprising a predetermined plural set of said outputs of electronic color measurement information of said color spectrophotometer system from discrete pre-measured target area spacings; and/or further including interpolation between adjacent said outputs of electronic color measurement information of said color spectrophotometer system respectively associated with adjacent said corresponding discrete pre-measured target area spacings wherein said target area spacing information signal is automatically combined with said color correction calibration information for at least partial correction of said color measurement errors of said color spectrophotometer for said variable spacing of said target surface from said color spectrophotometer by warping said color output of electronic color measurement information in proportion to a set of predetermined color measurements of said color spectrophotometer for respective plural known spacings of said spectrophotometer from a test target surface; and/or wherein said target area spacing information signal is compared to interpolated data from a set of predetermined color measurements of said color spectrophotometer for respective plural known spacings of said spectrophotometer from a test target surface; and/or wherein said color correction calibration information comprises an electronically stored table; and/or wherein said target surface variably spaced from said color spectrophotometer is the surface of print media in a printer moving past said color spectrophotometer; and/or wherein said spectrophotometer system further includes an optical fiducial marks sensor with an electronic output varying with said variable spacing of said target surface, and said target area spacing information signal is derived from said optical fiducial marks sensor electronic output; and/or in which said reflected illumination sensing system comprises a signal amplifier with an adjustable gain and said at least partial correction of said color measurement errors of said color spectrophotometer with said variable spacing of said target surface from said color spectrophotometer comprises varying the adjustable gain of said signal amplifier with said variable spacing of said target surface from said color spectrophotometer and said color correction calibration information.

Figure 6:
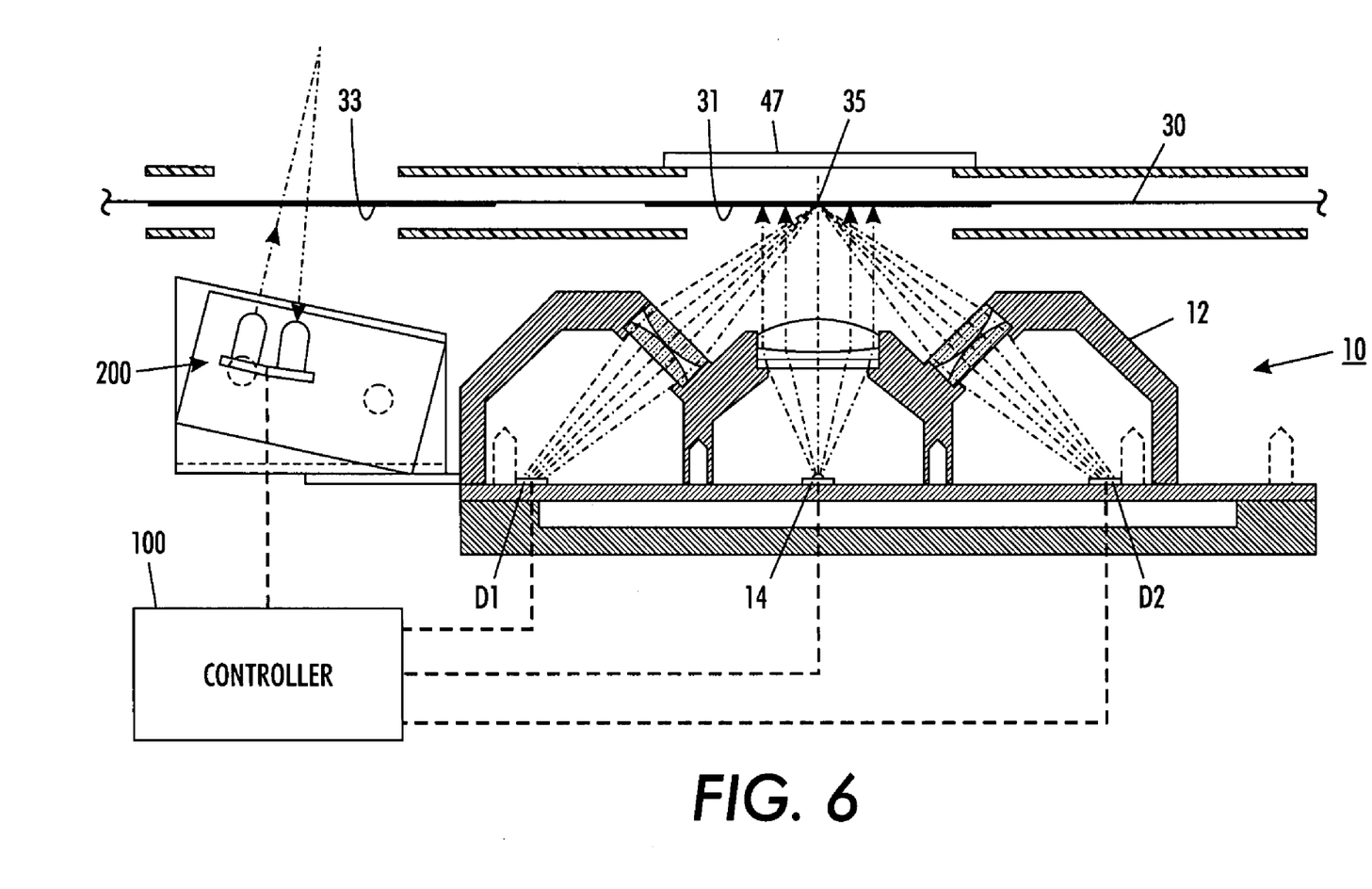
FIG. 6 shows, in a cross-sectional view similar to that of FIG. 2 of U.S. Pat. No. 6,639,669, an exemplary such plural LED spectrophotometer adjacent the paper path of a printer for scanning color test targets on a test sheet moving through that paper path, with a fiducial mark optical sensor for sensing fiducial marks on a test sheet, such as the test sheet further shown in FIG. 7 here.

The disclosed embodiments may be operated and controlled by appropriate operation of conventional control systems. It is well known and preferable to program and execute various electronic imaging and printing system control functions and logic with software instructions for conventional or general purpose microprocessors, as taught by numerous prior patents and commercial products. Such programming or software may, of course, vary depending on the particular functions, software type, and microprocessor or other computer system utilized, but will be available to, or readily programmable without undue experimentation from, functional and mathematical descriptions, such as those provided herein, and/or prior knowledge of functions which are conventional, together with general knowledge in the software or computer arts. Alternatively, the disclosed control system or method may be implemented partially or fully in hardware, using standard logic circuits or single chip VLSI designs. LED drivers, photosensors and output controls are well known from the above-cited and other art and need not be re-described herein. A controller 100 is schematically illustrated in FIG. 6 for any of the above, as a part of a printer or other product centralized software system and/or specifically associated with the spectrophotometer.

The term "reproduction apparatus" or "printer" as used herein broadly encompasses various printers, copiers or multifunction machines or systems, xerographic or otherwise, unless otherwise defined in a claim. The term "sheet" herein refers to a usually flimsy physical sheet of paper, plastic, or other suitable physical substrate for images, whether precut or web fed. A "copy sheet" may be abbreviated as a "copy" or called a "hardcopy." The term "spectrophotometer" as used in the claims herein broadly encompasses color measurement devices including calorimeters and densitometers, even if they do not cover all or full spectra, that also have target displacement issues, unless otherwise indicated.

As to specific components of the subject apparatus or methods, or alternatives thereof, it will be appreciated that, as is normally the case, some such components are known per se in other apparatus or applications, which may be additionally or alternatively used herein, including those from art cited herein. All cited references, and their references, are incorporated by reference herein where appropriate for teachings of additional or alternative details, features, and/or technical background. What is well known to those skilled in the art need not be described herein.

Various of the above-mentioned and further features and advantages will be apparent to those skilled in the art from the specific apparatus and its operation or methods described in the examples below, and the claims. This will be better understood from this description of specific embodiments, including the drawing figures (which are approximately to scale) wherein:

Describing now in further detail the exemplary embodiment with reference to the Figures, there is shown in FIG. 6 one example of a plural LED illuminators spectrophotometer system 10 for improved accuracy with greater variances in test target displacements, such as printed sheets variably moving in a printer sheet path. Since the exemplary spectrophotometer 12 itself here, and its operation, is extensively described in the above cited and incorporated issued U.S. patents thereon, it need not be repetitively re-described herein. In particular, as to the exemplary fiducial mark 33 and the fiducial mark optical detector (sensor) system 200 shown here, there is noted the illustrations and descriptions for the corresponding reference numbers 33 and 200 and elsewhere in the above-cited U.S. Pat. No. 6,639,669 issued Oct. 28, 2003 to Hubble et al.

The fiducial mark optical detector 200 shown here in FIG. 6 is being utilized in this example for an additional function, of target spacing measurement. This detector 200 is a simple low cost optical illuminator/sensor for illuminating and obtaining a reflection signal from a printed fiducial mark in contrast to the different signal from unprinted paper areas in between fiducial marks. Its illumination source can be visible light, UV or IR. For purposes of the present embodiment, it has been additionally found that its sensitivity, in terms of its pull down voltage output or otherwise, plots a reasonably consistent correlation to test target displacement on both sides of its nominal displacement, e.g. minus 3 mm to minus 6 mm from a nominal target spacing and plus 2 mm to plus 7 mm from that nominal target spacing. By feeding that target-spacing-variant fiducial mark sensor 200 signal to an A to D converter the data from each fiducial mark sensing signal can be compared with a stored calibration plot of the correlation to target displacement. That in turn yields a signal, which can be used as described below to correspondingly vary and control the illumination output of the spectrophotometer LEDs, or, correct the output of the spectrophotometer sensors. Such as by varying the spectrophotometer LED "on" times, or applied LED power pulse widths, to vary the total illumination energy per LED operating cycle, hence to vary the total reflected light received by the spectrophotometer sensor or sensors at each measurement to compensate for what would otherwise be variations due to target displacement variations rather than just the variations in the density or color of the test targets that are intended to be measured.

Two said fiducial mark sensors may be positioned at opposite sides of the target path. Alternatively, two said fiducial mark sensors may be offset, by, for example, 2 mm from one another (so that one will be more out of focus than the other) and the position value common to both sensor outputs may be taken, to uniquely identify the location of the target in the "z" direction.

Figure 7:
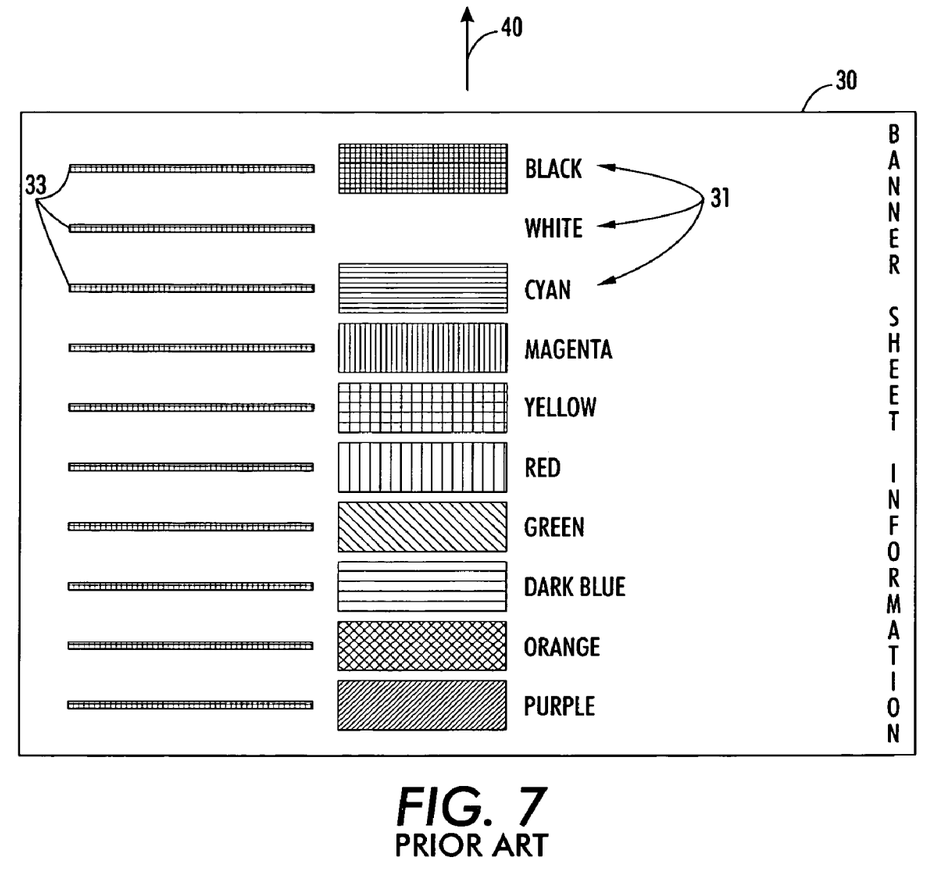
FIG. 7, labeled "prior art," is one example of a printer color target test sheet, copied from FIG. 4 of U.S. Pat. No. 6,384,918.

FIG. 7 is provided merely as one example of a printer color test targets sheet 30 (further described as FIG. 4 in incorporated U.S. Pat. No. 6,384,918) moving in a direction 40 in the printer paper path showing examples of such spaced black fiducial marks 33 adjacent to some examples of printed color test patches 31, providing spectrophotometer LED triggering signals from the fiducial mark sensor 200 in FIG. 6 here positioned to scan these fiducial marks 33. As shown, such a color printing accuracy or calibration test sheet 30 can optionally also be imprinted with banner sheet information (print job identification or separation), or other information.

However, other known target displacement measurement systems could alternatively be used, such as ultrasonic systems, or a lightweight pivotal flag arm lightly angularly engaging the moving target with an opposite end variably partially engaging the optical slot of a photodetector or low cost commercial optical interrupter to provide a variable displacement signal. Or, commercially available small displacement optical sensors could be used, such as the Omron™ Z4D-A01 reflective displacement sensor.

By way of further explanation of the problem addressed, as noted, target displacement or z axis variation from the spectrophotometer 12 results in a variation in the amplitude or level of the reflected light power received from the illuminated target area 35 by the spectrophotometer's circularly surrounding four or more sensor photodiodes D1, D2, etc., as the target area 35 is being rapidly sequentially angularly illuminated by the four or more different spectral illumination LEDs, which may be on a central optical axis (perpendicular to the paper path) LED chip 14. This is only partially mitigated by the illustrated displacement invariant optics that are noted above and further discussed in the above-cited patents. This variation in received light power with target displacement can result in degraded spectrophotometer output performance, in particular, a color measurement error.

Figure 1:
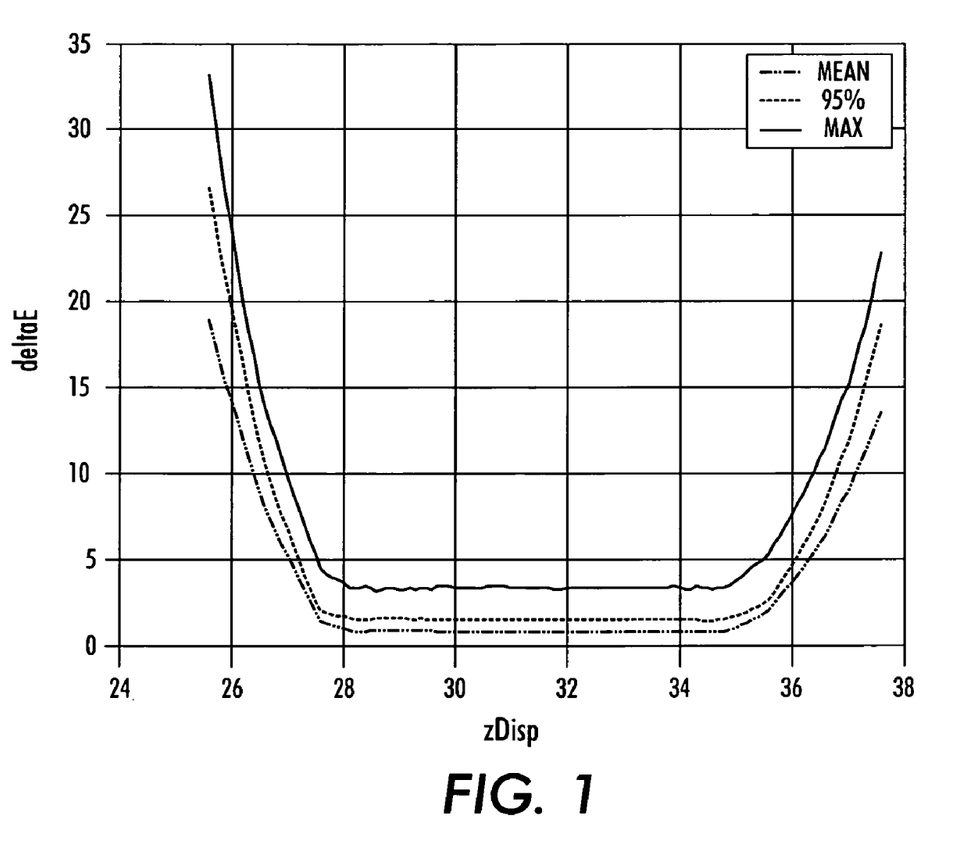
FIG. 1 is an exemplary chart illustrating the uncorrected error of an exemplary LED spectrophotometer as a function of target (z) displacement in mm.

FIG. 1 illustrates a model simulation of a present exemplary spectrophotometer 12 optical sensor performance over a displacement range centered at a nominal 31.5 mm, using only fixed LED "on times" calibrated for the nominal displacement: LED_ontime(iLED,$z_0$) where iLED is one of the illumination LEDs 14, and $z_0$ is the nominal target displacement. The statistics noted in FIG. 1 (mean, 95%, max) refer to the target color patch set used in this simulation, which represents the color gamut of one exemplary existing color printer. Note the low dE (delta E) error response due to the displacement invariance optics from 28 mm to 35 mm, which are ±3.5 mm around the design point of 31.5 mm. Note, however, the large dE errors beyond this operating region. This variation in received power is generally repeatable and is correctable by the systems and methods taught herein.

In particular, the length of time the respective LEDs at 14 emit light may be adjusted in proportion to the target displacement so that the total received light power is substantially constant over the target displacement range of interest. In real time the LED based spectrophotometer 12 or its associated circuitry may measure the target displacement such as by the system described above. I.e., such as by using a fiducial mark sensor signal from existing or modified spectrophotometer fiducial mark sensor 200 (and the test target fiducial marks they sense), such as those described in the above-cited U.S. patents, or some other optical or acoustic displacement measuring device. This target displacement signal may then be used to automatically, in real time, adjust the LED pulse widths to produce the appropriate amount of light output for the detected target spacing of that and/or other target areas from the spectrophotometer.

It is anticipated that this automatic compensation can be done rapidly enough to compensate even for rapid target displacement variations, such as targets on different areas of curled sheets, or on sheets with some movement flutter, on a target sheet fairly rapidly moving past the spectrophotometer in a sheet path spacing desirably confined only by opposing sheet path baffles which are spaced considerably further apart from one another that the nominal operating range of the spectrophotometer. This may depend on the systems used to sense the target area displacement and make the correction. The computation time itself is relatively minimal, as shown below, so that with a sufficiently fast sensor the "z" displacement could be measured and corrected for each test patch 31 target area. If the correction computation is done after the color measurement of the target area is made, rather than used for varying the target illumination, the compensation for target distance variation may even be done after reading several test patches.

One can obtain the desired corrective gains by taking the reciprocal of the plotted curve of the respective received sensor illumination power normalized to a nominal "z" axis displacement. The received illumination power at various displacements can be measured by using the same standard calibration tile to calibrate the sensors at positions across the displacement range of interest, in fine incremental intervals or by using coarser intervals and standard interpolations.

Figure 2:
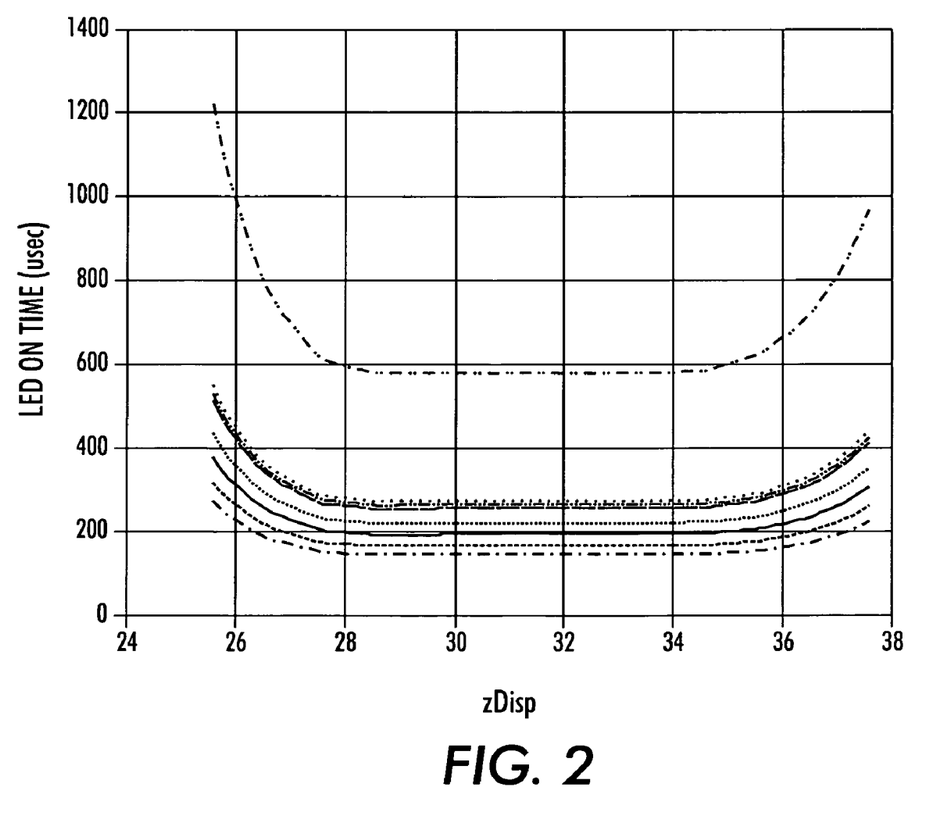
FIG. 2 is an exemplary calibration chart for varying LED "on" times as a function of target displacement in mm.

The LED spectrophotometer initial calibration procedure may be conventional. The purpose of the calibration procedure is to adjust the LED illuminators "on times" (pulse widths) until a desired amount of total power is received (which may be measured in analog to digital counts) for a known reference target such as a test tile 47 of known color and/or reflectivity spaced from the spectrophotometer at a nominal displacement, as taught in the above-cited patents. Note that the total received (reflected back and detected) light is integrated over time (over the LED pulse width) to obtain the total received power (total energy). Thus by modulating the LED pulse width, the total received power is modulated proportionally. Due to focus and light capture factors, one of the factors which affect this received light power is the displacement distance from the sensor to the target. By performing the above calibration procedure at various displacement distances over the displacement range of interest, one can record and/or store the LED "on times" required to produce the same total received power over the range of interest. This results in the following quantity:

$$\text{LED\_ontime}(iLED, z)$$
$$z \in \{z_1, z_2, \ldots, z_N\}$$

where iLED is one of the illumination LEDs, z is a target displacement where a calibration was made, and the set of $z_i$'s is the set of calibration grid points. Such calibration simulation results are shown in FIG. 2.

The eight different curves shown in the FIG. 2 example represent eight different LEDs 14 used in this particular spectrophotometer example. One can see the correlation between FIG. 2 and FIG. 1. For z-displacements from 28 mm to 35 mm, the required LED "on time" to produce a desired received signal for a target of known reflectance is substantially constant. However, for displacements outside this range, the LED pulse widths here need to be lengthened in order to achieve the desired total received signal level for the same target range. That is, the LED pulse widths ("on times") need to be lengthened in order to achieve essentially the same desired received signal level for the same target reflectance. Since LED "on time" may also be adjusted for various other reasons (e.g. LED output variation due to temperature), a relative effect for displacement is measured. Normalizing the LED "on times" at the various displacements to the LED "on time" required at the nominal displacement distance of 31.5 mm produces a set of scalar values for each displacement which can be used to dynamically adjust the LED "on times" to compensate for the loss of signal effects. The formula to determine the scalar adjustment factors is as follows:

$$K(iLED, z) = \frac{\text{LED\_ontime}(iLED, z)}{\text{LED\_ontime}(iLED, z_0)}$$
$$z \in \{z_1, z_2, \ldots, z_N\}$$

Figure 3:
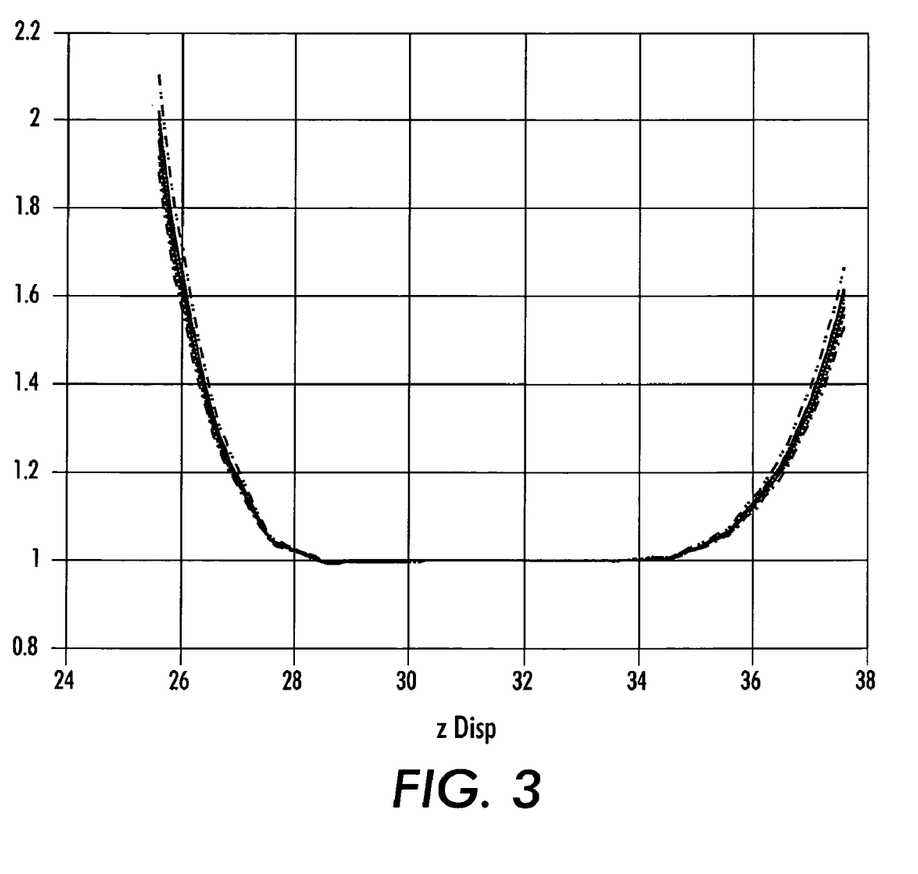
FIG. 3 is an exemplary chart of calibration LED "on" times normalized to a normal target (z) displacement.

A plot of normalized LED on times is shown in FIG. 3, where a value of 1.0 represents the pulse width at the nominal displacement. Note that pulse widths up to two times as long as nominal may be required for this displacement range. This can have a small impact on the desired target patch 31 size in some cases. That is due to the increased time the LEDs 14 stay on while the target is moving in this example. Assuming a constant target velocity and a double LED "on time," the minimum target patch 31 size in its movement direction may also need to be doubled. Thus, the target patch 31 extent in the process direction may be set to be printed to accommodate the maximum increase in LED "on time" for the particular system and installation.

Now at run time, the appropriate quantity LED_ontime (iLED,z) for any arbitrary displacement, z, is not known a priori, but can be estimated using the scale factors, K(iLED, z), and the calibrated LED on times at the nominal displacement, LED_ontime(iLED,$z_0$) using the following equation:

$$\hat{\text{LED\_ontime}}(iLED,z) = K(iLED,z) \cdot \text{LED\_ontime}(iLED,z_0)$$

Note that LED_ontime(iLED,$z_0$) will change due to temperature drift and other factors and should be re-measured (re-calibrated) periodically. This relatively rapid change may preclude a complete pre-calculation of LED_ontime (iLED,z) directly, but readily admits the scale factor based solution described here. Using this estimated value for the displacement based LED "on time," a simulation model plot of sensor performance is shown in FIG. 4.

Figure 4:
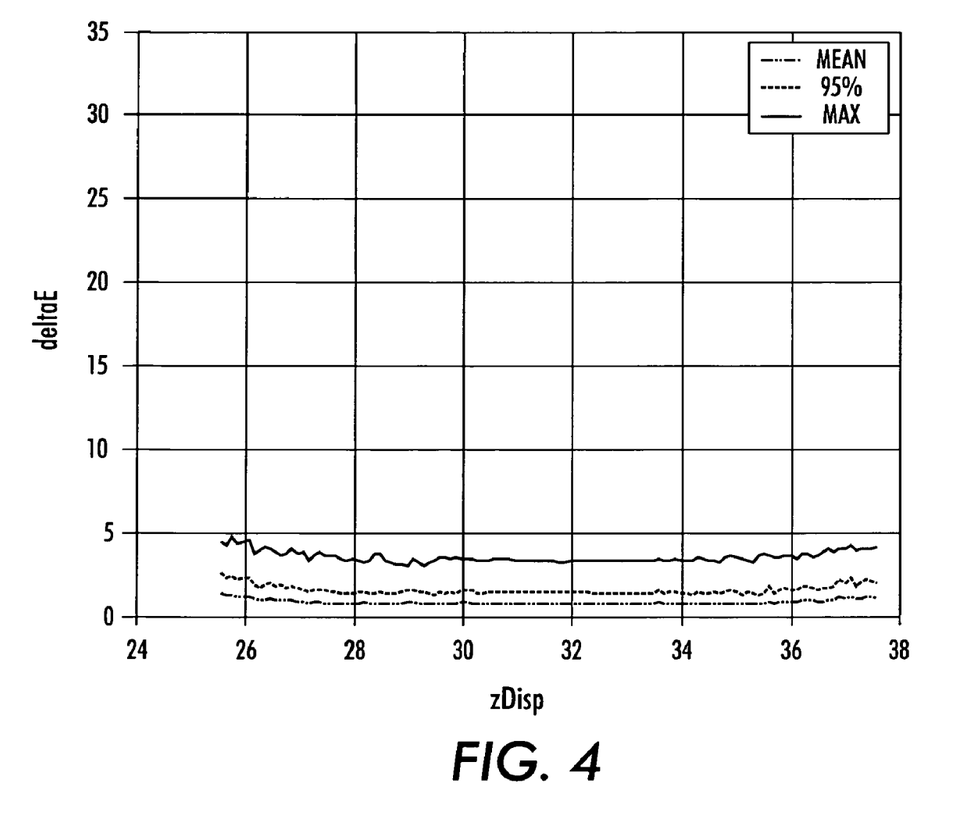
FIG. 4 is a chart of simulated sensor displacement performance using scaled LED "on" times.

Comparing FIGS. 1 and 4, an improvement in dE performance beyond 28 mm and 35 mm is seen. For example, at a displacement of 25.5 mm (6 mm away from the nominal displacement) a dE improvement of almost 25 dE units may be obtained.

The calibration procedure is a quick procedure, and, in order to calculate the LED "on" time scalars, as part of the manufacturing process each sensor could be calibrated at fine displacement intervals across the entire range of interest. For modern microprocessor based systems, storing a complete set of scalars would not consume excessive memory (121×8 bytes if calibrated at every 0.1 mm). The test tile repositioning movements could be readily automated by a stepper motor drive or the like.

However, to reduce time (and cost) at manufacturing, calibration and scalar value generation could be performed at coarser intervals, and interpolation between scalar values could be employed. This can be performed as follows:

Given the displacement, z, determine the bracketing displacement grid points in the scale factor look up table.

$$K(iLED, z_i), K(iLED, z_{i+1})$$

$$z_i \leq z \leq z_{i+1}$$

Now in real-time, interpolate between the grid points, resulting in the scale factor estimate for the displacement of interest:

$$K(iLED, z) = \left(1 - \frac{z - z_i}{z_{i+1} - z_i}\right) \cdot K(iLED, z_i) + \left(\frac{z - z_i}{z_{i+1} - z_i}\right) \cdot K(iLED, z_{i+1})$$

Figure 5:
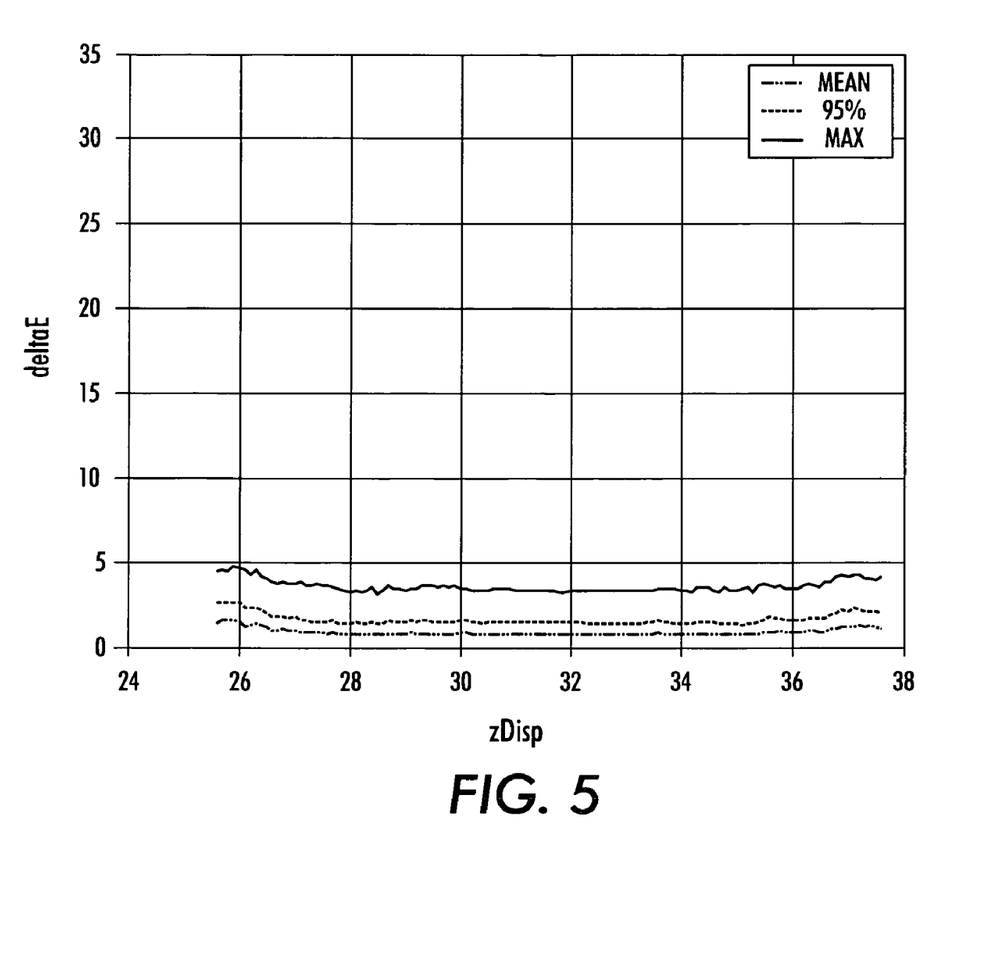
FIG. 5 is a chart of simulated sensor displacement performance using interpolated values.

Simulated results of this procedure in which scalar values were interpolated between 0.5 mm intervals is shown in FIG. 5. This also results in using five times less memory to store the table, with almost no loss in performance.

Any standard interpolation scheme could be used, including linear interpolation or lower or higher order polynomial interpolation.

Note that instead of modulating the pulse width of the LEDs 14, in some spectrophotometers it might be possible that the pulse amplitude of the LEDs could be somewhat similarly modulated to similarly compensate for the signal loss due to displacement variation. Other waveform shapes and modulations are also possible.

The method described of adjusting LED "on times" clearly improves sensor accuracy over the displacement range shown, as seen by comparing FIGS. 4 and 5 with FIG. 1. This is due to the fact that displacement primarily affects received power as opposed to spectral content. Displacement variation causes an "out of focus" effect where less light hits the receiver photodiodes. Thus compensation by modulating the illumination waveforms is effective.

An embodiment of the system might be as follows:
1. At Manufacture Time
   1.1. Assemble the Sensor System
   1.2. Characterize the Sensor or Personalize the Sensor, where the sensor is calibrated at the nominal operating displacement
   1.3. Calibrate the Sensor at a set of displacements and note the percentage change in LED Pulse Width required to obtain the target value for the reference target at each displacement. This may be performed a number of times at each displacement and averages calculated to reduce the effect of noise on the measurements.

$$K(iLED, z) = \frac{\text{LED\_ontime}(iLED, z)}{\text{LED\_ontime}(iLED, z_0)}$$

$$z \in \{z_1, z_2, \ldots, z_N\}$$

1.4. Store the table of percentage change in LED Pulse Width for each displacement in NVM on the sensor
2. In Real Time (installed)
   2.1. Calibrate the Sensor to its reference surface 47 (embedded in the in situ environment at a nominal displacement from the sensor)

LED_ontime($iLED, z_0$)

2.2. Measure the displacement of the targets using a measuring device, such as the fiducial mark sensor as described herein.
   2.3. Use the look up table stored in memory with possible interpolation to determine the correct percentage change in LED pulse width required for the displacement that was measured $$K(iLED, z_i), K(iLED, z_{i+1})$$

$$z_i \leq z \leq z_{i+1}$$

$$K(iLED, z) = \left(1 - \frac{z - z_i}{z_{i+1} - z_i}\right) \cdot K(iLED, z_i) + \left(\frac{z - z_i}{z_{i+1} - z_i}\right) \cdot K(iLED, z_{i+1})$$

2.4. Adjust the LED pulse width targets using the calibrated value (at nominal displacement) and the percentage change value from the table (with possible interpolation). This could be done by simply adjusting a counter value in a microcontroller. This can be done very quickly (on 100's of nanosecond timescale), while the test target paper sheet is moving under the spectrophotometer, after the fiducial mark sensor makes its measurement to trigger the spectrophotometer, but before the actual LEDs fire. Note that this extra operation can be performed in total on a microsecond time scale and the paper will move only a negligible amount during this time. Thus the impact on color target size is negligible.

$\widehat{\text{LED\_ontime}}(iLED,z) = K(iLED,z) \cdot \text{LED\_ontime}(iLED,z_0)$ 2.5. Continue with the normal test target color measuring system usage of the spectrophotometer.

The following is another disclosed method for compensation for induced variations in the spectrometer sensor output from target displacement variations. Instead of changing the target illumination such as by calibrated LED driver pulse width changes, the spectrophotometer output can be corrected for the same (consistent) LED illumination levels. Several correction models may be constructed. Each model may be trained at a unique displacement resulting in a set of models (which may also be called spectral reconstruction matrices) that span the increased target displacement range of interest. Then, during spectrophotometer operation against a variable target area, briefly, in real-time, the z-axis displacement of the target from the spectrophotometer may be measured using a suitable displacement measuring device, as described above or otherwise. Then the software may interpolate between the above plural models (spectral reconstruction matrices) to estimate the appropriate model to use for the actual, measured, current displacement of interest. This estimated model is then used to perform an accurate spectral reconstruction used in estimating the color of the target of interest. Thus in real-time the nominal spectral reconstruction matrices may be electronically adjusted (corrected or warped) in proportion to the target displacement distance to get improved spectral accuracy. In other words, a database of spectral reconstruction matrices may be constructed offline with respect to some discrete known displacements. Then, a conventional interpolation algorithm can interpolate between the matrices for improving the spectral reconstruction accuracy for finer displacements where the discrete spectral reconstruction matrices are not available in the database.

The particular subject hardware sensor may be initially calibrated at a given displacement, preferably the nominal displacement. This normally first entails building a model that describes the relationship between the LED reflectance signals and the target spectral reflectivity, such as measured by another, reference, spectrophotometer, such as an X-RITE 938™ device. A simple linear (affine) model may be used to describe the relationship over a local region.

Then the hardware sensor may be run through a displacement range to collect normalized LED reflectance data and the corresponding displacement data for a set of known color target patches. This may be personalized on a stored grid pattern of displacements yielding stored personalized "A" matrices (also called spectral reconstruction matrices) for each displacement grid point, with $A(d_o)$ as the nominal displacement:

$$A(d_o), A(d_1), A(d_2), \ldots, A(d_g)$$

These "A" matrices define the model described above for each displacement on the grid. Note that the "personalization" may also be a full "characterization." A full characterization may entail a comprehensive training of the model to a reference spectrophotometer, while a personalization entails an adjustment to a trained model to encompass differences between displacements for the same physical device. Note that for the personalization (or characterization) performed at each grid point, the sensor should be calibrated at the nominal z-displacement, then target data should be obtained at the grid height of interest. These "A" matrices may be stored in an embedded non-volatile data storage system. The reflectance gamut may be separated into regions or "clusters," where in each cluster a linear model is valid.

In real-time, the normalized reflectance may be calculated to determine the correct cluster and the actual displacement measured. Two "A" matrices for a given cluster that bracket the displacement measurement may be pulled out:

$$A(d_i), A(d_{i+1})$$

$$d_i \leq d \leq d_{i+1}$$

Now, in real-time, one can linearly interpolate the two bracketing "A" matrices, yielding the "A" matrix to be used at the current displacement:

$$A(d) = \left(1 - \frac{d - d_i}{d_{i+1} - d_i}\right) A(di) + \left(\frac{d - d_i}{d_{i+1} - d_i}\right) A(d_{i+1})$$

A(d) above may be used to calculate the estimated reflectance spectrum for the actual target under study. This will yield a performance curve very similar to FIG. 4.

Note that linear interpolation was used in the description above. Other standard interpolation algorithms are also possible including using higher and lower order polynomial interpolation.

The at least partial correction of the color measurement errors of the color spectrophotometer with the variable spacing of the target surface from the color spectrophotometer may in another embodiment utilize varying the adjustable gain of a signal amplifier for the output of the reflected illumination sensing system with the variable spacing of the target surface from the color spectrophotometer under the control of the color correction calibration information from the color correction calibration system. That is, signal processing of the detected reflected illumination with a signal amplifier having an adjustable gain can be used. Such as with a conventional or commercially available op-amp. E.g., a standard op-amp circuit with a programmable gain, such as by using a programmable potentiometer (resistor), or a device such as the MICROCHIP MCP6S28™, which is a commercially available programmable gain amplifier. Or, signal amplification software may be implemented in the digital microprocessor 100, such as by a mathematical scaling of the sampled data to correct for the distance variations.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A color spectrophotometer system with an illumination system and a reflected illumination sensing system for providing an output of electronic color measurement information from the colors of color target areas on a target surface illuminated by said illumination system, where said target surface may be variably spaced from said color spectrophotometer system, further including;
    at least one color correction calibration system providing color correction calibration information corresponding to color measurement errors of said color spectrophotometer for known said variable spacings of said target surface from said color spectrophotometer,
    a target distance measurement system for measuring said variable spacing of said target surface from said color spectrophotometer to provide a target area spacing information signal,
    said target area spacing information signal being automatically combined with said color correction calibration information from said color correction calibration system for at least partial correction of said color measurement errors of said color spectrophotometer for said variable spacing of said target surface from said color spectrophotometer.

2. The color spectrophotometer system of claim 1 in which said color spectrophotometer system illumination system comprises multiple different peak spectra sequentially illuminated LED's and said at least partial correction of said color measurement errors of said color spectrophotometer with said variable spacing of said target surface from said color spectrophotometer comprises varying the total illumination of said sequentially illuminated LED's with said variable spacing of said target surface from said color spectrophotometer under the control of said color correction calibration information from said color correction calibration system.

3. The color spectrophotometer system of claim 1 in which said color spectrophotometer system illumination system comprises plural different peak spectra sequentially illuminated LED's and said at least partial correction of said color measurement errors of said color spectrophotometer with said variable spacing of said target surface from said color spectrophotometer comprises varying the illumination time periods of said sequentially illuminated LED's with said variable spacing of said target surface from said color spectrophotometer with said distance measurement system target area spacing information signal and said color correction calibration information from said color correction calibration system.

4. The color spectrophotometer system of claim 1 including a controller for adjusting said output of electronic color measurement information of said color spectrophotometer system in proportion to said target area spacing information signal from said target distance measurement system.

5. The color spectrophotometer system of claim 1 including a controller for warping said output of electronic color measurement information of said color spectrophotometer system in proportion to said target area spacing information signal from said target distance measurement system, wherein said controller comprises a predetermined plural set of said output of electronic color measurement information of said color spectrophotometer system respectively associated with corresponding discrete pre-measured target area spacings.

6. The color spectrophotometer system of claim 5 further including an interpolator for interpolation between adjacent said outputs of electronic color measurement information of said color spectrophotometer system respectively associated with adjacent said corresponding discrete pre-measured target area spacings.

7. The color spectrophotometer system of claim 1 wherein said target area spacing information signal is automatically combined with said color correction calibration information from said color correction calibration system for at least partial correction of said color measurement errors of said color spectrophotometer for said variable spacing of said target surface from said color spectrophotometer by warping said color output of electronic color measurement information in proportion to a set of predetermined color measurements of said color spectrophotometer for respective plural known spacings of said spectrophotometer from a test target surface.

8. The color spectrophotometer system of claim 1 wherein said target area spacing information signal from said target distance measurement system is compared to interpolated data from a set of predetermined color measurements of said color spectrophotometer for respective plural known spacings of said spectrophotometer from a test target surface.

9. The color spectrophotometer system of claim 1 wherein said color correction calibration system comprises an electronically stored table.

10. The color spectrophotometer system of claim 1 wherein said target surface variably spaced from said color spectrophotometer is the surface of print media in a printer moving past said color spectrophotometer.

11. The color spectrophotometer system of claim 1 wherein said reflected illumination sensing system has an output operatively connected to a signal amplifier with an adjustable gain, wherein said at least partial correction of said color measurement errors of said color spectrophotometer with said variable spacing of said target surface from said color spectrophotometer comprises varying the adjustable gain of said signal amplifier with said variable spacing of said target surface from said color spectrophotometer under the control of said color correction calibration information from said color correction calibration system.

12. A color measurement method using a spectrophotometer system with an illumination system and a reflected illumination sensing system providing an output of electronic color measurement information from the colors of color target areas on a target surface illuminated by said illumination system, where said target surface is variably spaced from said color spectrophotometer system, further including;
providing color correction calibration information corresponding to color measurement errors of said color spectrophotometer for known different spacings of said target surface from said color spectrophotometer,
measuring said variable spacing of said target surface from said color spectrophotometer to provide a target area spacing information signal,
automatically combining said target area spacing information signal with said color correction calibration information to provide at least partial correction of said color measurement errors of said color spectrophotometer for said variable spacing of said target surface from said color spectrophotometer.

13. The color measurement method of claim 12 in which said illumination system comprises sequentially illuminated plural different peak spectra LED's and said at least partial correction of said color measurement errors of said color spectrophotometer with said variable spacing of said target surface from said color spectrophotometer comprises varying the total illumination of said sequentially illuminated LED's with said variable spacing of said target surface from said color spectrophotometer and said color correction calibration information.

14. The color measurement method of claim 12 in which said color spectrophotometer system illumination system comprises multiple different peak spectra sequentially illuminated LED's and said at least partial correction of said color measurement errors of said color spectrophotometer with said variable spacing of said target surface from said color spectrophotometer comprises varying the illumination time periods of said sequentially illuminated LED's with said target area spacing information signal and said color correction calibration information.

15. The color measurement method of claim 12 including adjusting said output of electronic color measurement information of said color spectrophotometer system in proportion to said target area spacing information signal.

16. The color measurement method of claim 12 including adjusting said output of electronic color measurement information of said color spectrophotometer system in proportion to said target area spacing information signal from said target distance measurement with a controller comprising a predetermined plural set of said outputs of electronic color measurement information of said color spectrophotometer system from discrete pre-measured target area spacings.

17. The color measurement method of claim 16 further including interpolation between adjacent said outputs of electronic color measurement information of said color spectrophotometer system respectively associated with adjacent said corresponding discrete pre-measured target area spacings.

18. The color measurement method of claim 12 wherein said target area spacing information signal is automatically combined with said color correction calibration information for at least partial correction of said color measurement errors of said color spectrophotometer for said variable spacing of said target surface from said color spectrophotometer by warping said color output of electronic color measurement information in proportion to a set of predetermined color measurements of said color spectrophotometer for respective plural known spacings of said spectrophotometer from a test target surface.

19. The color measurement method of claim 12 wherein said target area spacing information signal is compared to interpolated data from a set of predetermined color measurements of said color spectrophotometer for respective plural known spacings of said spectrophotometer from a test target surface.

20. The color measurement method of claim 12 wherein said color correction calibration information comprises an electronically stored table.

21. The color measurement method of claim 12 wherein said target surface variably spaced from said color spectrophotometer is the surface of print media in a printer moving past said color spectrophotometer.

22. The color measurement method of claim 12 wherein said spectrophotometer system further includes an optical fiducial marks sensor with an electronic output varying with said variable spacing of said target surface, and said target area spacing information signal is derived from said optical fiducial marks sensor electronic output.

23. The color measurement method of claim 12 in which said reflected illumination sensing system comprises a signal amplifier with an adjustable gain and said at least partial correction of said color measurement errors of said color spectrophotometer with said variable spacing of said target surface from said color spectrophotometer comprises varying the adjustable gain of said signal amplifier with said variable spacing of said target surface from said color spectrophotometer and said color correction calibration information.

* * * * *